US007890319B2

(12) United States Patent
Garner

(10) Patent No.: US 7,890,319 B2
(45) Date of Patent: Feb. 15, 2011

(54) SIGNAL PROCESSING APPARATUS AND METHOD THEREOF

(75) Inventor: Philip Garner, Martigny (CH)

(73) Assignee: Canon Kabushiki Kaisha, Tokyo (JP)

( * ) Notice: Subject to any disclaimer, the term of this patent is extended or adjusted under 35 U.S.C. 154(b) by 974 days.

(21) Appl. No.: 11/735,690

(22) Filed: Apr. 16, 2007

(65) Prior Publication Data

US 2007/0250312 A1 Oct. 25, 2007

(30) Foreign Application Priority Data

Apr. 25, 2006 (JP) ............................ 2006-121270

(51) Int. Cl.
*G06F 15/00* (2006.01)
*G10L 21/00* (2006.01)

(52) U.S. Cl. ...................................... 704/200; 704/226

(58) Field of Classification Search .................. 704/200
See application file for complete search history.

(56) References Cited

U.S. PATENT DOCUMENTS

RE38,269 E * 10/2003 Liu ............................ 704/227
6,931,292 B1 8/2005 Brumitt et al.
2003/0018471 A1 1/2003 Cheng et al.
2006/0206321 A1* 9/2006 Droppo et al. .............. 704/226
2007/0150270 A1* 6/2007 Huang ........................ 704/226

FOREIGN PATENT DOCUMENTS

WO 02/095732 11/2002

OTHER PUBLICATIONS

T. Fingscheidt, et al., Overcoming the Statistical Independence Assumption W.R.T. Frequency in Speech Enhancement, 2005 IEEE International Conference on Acoustics, Speech and Signal Processing (ICASSP), Mar. 18-23, 2005, pp. 1081-1084, vol. I.

* cited by examiner

*Primary Examiner*—Justin W Rider
(74) *Attorney, Agent, or Firm*—Canon U.S.A., Inc. I.P. Division

(57) ABSTRACT

An improved and computationally efficient signal processing is provided to estimate and reduce noise in a sampled signal. Hence, a first filter recursive filters a vector in the signal in one direction along the vector, a second filter recursive filters the vector in the opposite direction to the first filter along the vector, and a combining section combines the results of the first and second filters. Coefficients of the first and second filters are dependent on a position in the vector.

3 Claims, 5 Drawing Sheets

SIGNAL PROCESSING APPARATUS AND METHOD THEREOF

BACKGROUND OF THE INVENTION

1. Field of the Invention

The present invention relates to signal processing for a signal such as a speech signal.

2. Description of the Related Art

In many digital signal processing (DSP) systems, an input signal is processed by fast Fourier transform (FFT), or a similar operation, to yield a frequency-domain representation of the signal. In the case of the FFT, this representation is a vector of complex values in which squaring and adding the real and imaginary values to give a vector of real values yields a vector known as the periodogram. The periodogram is sometimes referred to as the PSD (Power Spectral Density), and the term PSD is used here for brevity. The PSD is a useful representation because if the signal is assumed to be the sum of two independent signals, the PSD is also approximately the sum of the two independent PSDs.

In audio DSP, the input signal often consists of two signals: a speech signal being a representation of the sound of a person speaking, and a noise signal being circuit noise generated by an electronic circuit, or background noise from machinery, vehicles or the like. Two distinct applications depend on the ability to remove the noise signal from the total signal to give a clean speech signal:

Automatic Speech Recognition (ASR)—the goal of ASR is to recognize the sounds spoken by a user and perform some action based on those sounds. The action may be to transcribe the speech or to operate a machine based on commands spoken. ASR systems are usually only receptive to clean speech. If noise-corrupted speech is applied to an ASR system, the performance decreases drastically.

Speech Enhancement—the goal of speech enhancement is to produce a clean, audible, speech signal given a noisy speech signal. For instance, if one user speaking into a telephone is standing near a noisy machine, a second user listening on the other telephone hears both the first user and the machine. The second user would prefer to hear just the first user without the machine; this can be achieved by the speech enhancement.

In the above example applications, a procedure known as Spectral Subtraction (SS) is often used to remove noise from a signal. The basic premise is that, as the speech and noise PSDs are additive, the speech can be recovered by simply subtracting an estimate of the noise.

A typical SS procedure is as follows, and also illustrated in FIG. 1. Note that FIG. 1 is a block diagram that shows construction of a pre-processing part of speech recognition processing including SS.

An Hartley transformation unit 16 inputs a signal divided into overlapping frames, and transforms the input signal into information in a frequency domain. A periodogram calculator 17 calculates a PSD of the input signal.

A noise estimation unit 32 calculates an average noise PSD over several frames during a period of silence, when the person is not speaking and only the noise is present.

A spectral subtraction (SS) unit 33 subtracts the average noise PSD from the calculated PSD for each frame to obtain a de-noised or clean speech PSD.

In the case of ASR, the clean speech PSD is then filtered using a mel-scaled filter 18 to produce a PSD vector that is shorter than the original PSD. The logarithm of the mel scaled PSD is then calculated by a logarithm calculator 19 before being further processed for use as a feature for a pattern recognition algorithm such as an Hidden Markov Model (HMM).

In the case of enhancement, the de-noised speech PSD is combined with the noise PSD to form, for example, a Wiener filter. The Weiner filter is then used to weight the complex FFT result, which is then inverted using the IFFT (Inverse FFT). Finally, an overlap and add process is applied to give a reconstructed audio signal.

The main problem with the above process is that the noise estimation unit 32 and the SS unit 33 are imperfect. In the case of noise estimation, the estimate is calculated from a finite number of PSD frames. If only a small number of frames is available for noise calculation, the estimate is unlikely to be accurate. This in turn adds to the second, otherwise independent, problem:

As the PSD has random variation, the SS process can sometimes give a clean speech PSD result that is zero or negative. As all PSD values must be positive (by definition), some correction is required. Simply flooring negative PSD values to zero is known not to work well. In the ASR case, a subsequent operation is a logarithm that causes near-zero values to approach minus infinity—well out of the normal range for such features. In enhancement, the small values lead to the phenomenon of musical noise—tones resembling music introduced into the signal.

Two distinct solutions to the zero PSD problem are commonly used:

Flooring—in ASR, the result of SS is not allowed to fall below a flooring value, normally a scaled version of the PSD before SS.

Temporal Filtering—in enhancement, the SS value is floored at zero, but is then filtered temporally such that the final value is a linear combination of the raw SS and the result from the previous frame. The applicant has found such filtering not to be beneficial for ASR.

The concepts of speech enhancement, Wiener filtering and spectral subtraction are well known in the art and are described in the book “Discrete Time Speech Signal Processing” by Quatieri, ISBN 0-13-242942-X.

The concepts of ASR and mel filtering are well known in the art and are described in the book “Fundamentals of Speech Recognition” by Rabiner and Juang, ISBN 0-13-015157-2.

Kalman filtering is well known in the art and is described in the book “Statistical Signal Processing—Detection, Estimation and Time Series Analysis” by Scharf, ISBN 0-201-19038-9.

Temporal smoothing of spectral bins is well known in the art and is described in the paper “Speech Enhancement Using a Minimum Mean-Square Error Short-Time Spectral Amplitude Estimator” by Ephraim and Malah in IEEE Transactions on Acoustics Speech and Signal Processing, volume 32, no. 6, pages 1109 to 1121.

Brumitt (U.S. Pat. No. 6,931,292) describes an enhancement technique that uses both temporal and transversal (frequency) smoothing. The transversal smoothing is an FIR filter rather than a recursive filter, and the coefficients are fixed rather than dependent on the position in the PSD.

Fingscheidt (WO 02095732 and ICASSP 2005 volume I page 1081) also describes a spectral filter that depends upon adjacent spectral bins. However the coefficients do not depend on the position in the PSD. The spectral filter in this case is also temporal, whereas the invention strives to avoid temporal filtering of the PSD.

Cheng and Agarwal (US Application 20030018471) describe a state of the art noise removal system for ASR. The system uses similar and techniques to those in the invention as well as additional one, such as Wiener filtering. It does not, however, incorporate a Kalman-like recursive filter, and is substantially more computationally complex.

SUMMARY OF THE INVENTION

In one aspect, a signal processing method recursively filters the vector in one direction along the vector, recursively filters the vector in the opposite direction to the first filtering along the vector, and combines the results of the first and second filtering, wherein coefficients of the first and second filtering are dependent on a position of the vector.

The signal processing method can reduce noise in a signal.

Further features of the present invention will become apparent from the following description of exemplary embodiments with reference to the attached drawings.

DESCRIPTION OF THE EMBODIMENTS

Signal processing according to embodiments of the present invention will be described in detail hereinafter with reference to the accompanying drawings.

[Outline]

The fundamental problem with SS is that statistical estimates of PSD values are made using very small amounts of data. In the case of the raw SS PSD, only one (PSD) value is used for each estimate. More robust estimates would follow from basing estimates on more data.

This invention is based on the following premises:

First, the frame size is chosen to be the minimum time period for which the signal is stable. In other words, successive frames are assumed to be uncorrelated. This is very close to the assumption used in HMMs.

Secondly, the PSD vector size is too large. That is, the speech spectrum actually has far fewer degrees of freedom than the number of PSD values. It follows that adjacent PSD values are highly correlated.

It follows from the above assumptions that temporally filtering PSD values is to be avoided, whereas transversal filtering (along the PSD vector within a single frame) ought to be beneficial. The applicant has found that application of these assumptions yields an improvement over the prior art.

The feature of the invention is a form of Kalman smoother applied transversally. Kalman smoothers are well known in the art; however, the recursion equations used in this embodiment are not the usual ones. The smoother takes the form of two single pole recursive filters. A first filter is initialized from the first PSD value in the vector, and the filtering runs up the PSD vector to the highest indexed value. A second filter is nearly identical to the first, except that it runs from the highest indexed PSD value down to the first PSD value. The two filtered signals are then linearly combined to give a single Kalman smoothed PSD.

[SS Procedure]

The SS procedure of the embodiment is summarized as follows:

First, several noise frame PSDs are summed, and the summed PSD is smoothed using the Kalman smoother. The coefficients of each filter are chosen to normalize the summation. The smoother output constitutes an improved noise PSD estimate.

Secondly, the noise PSD estimate is subtracted from each subsequent frame PSD, and negative values are floored at zero to give an SS PSD.

Thirdly, the SS PSD is smoothed using the Kalman smoother to give a smoothed clean speech PSD. The filter coefficients are optionally modified to include a flooring value.

Figure 1:
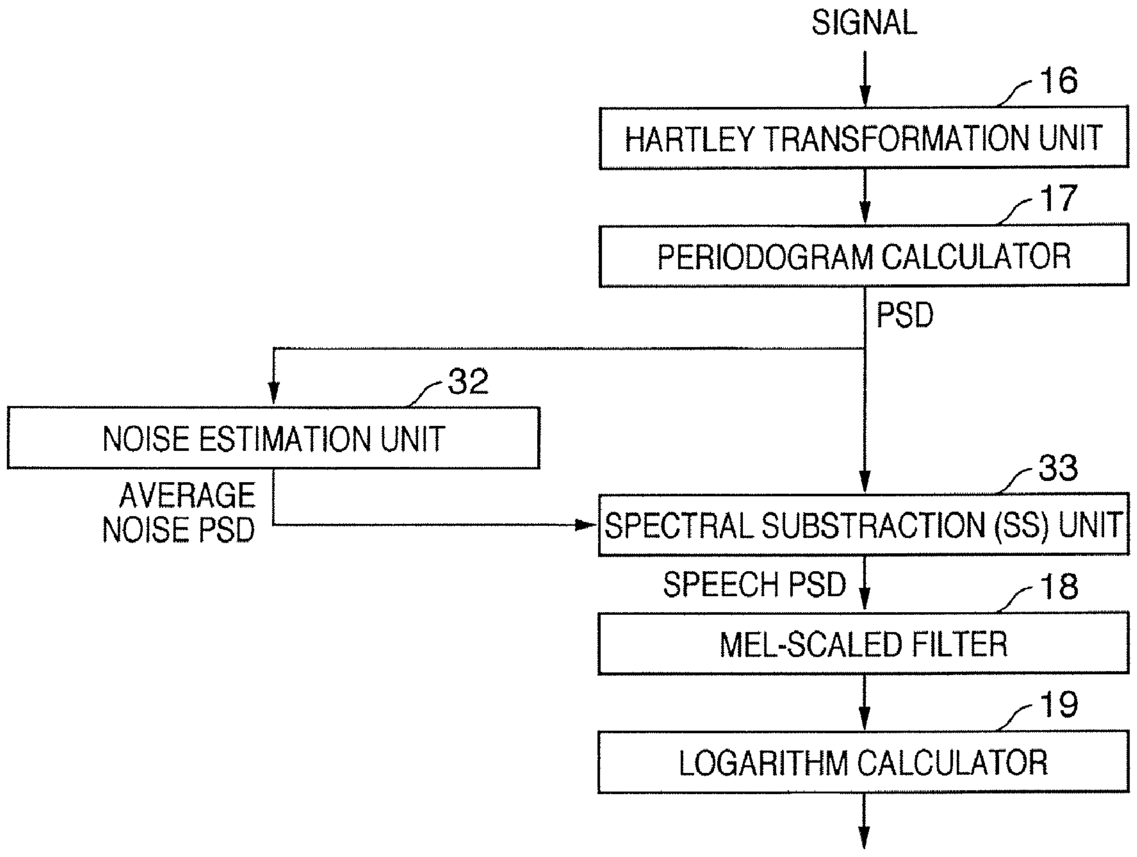
FIG. 1 shows a portion of an ASR front-end modified to perform spectral subtraction.
Figure 2:
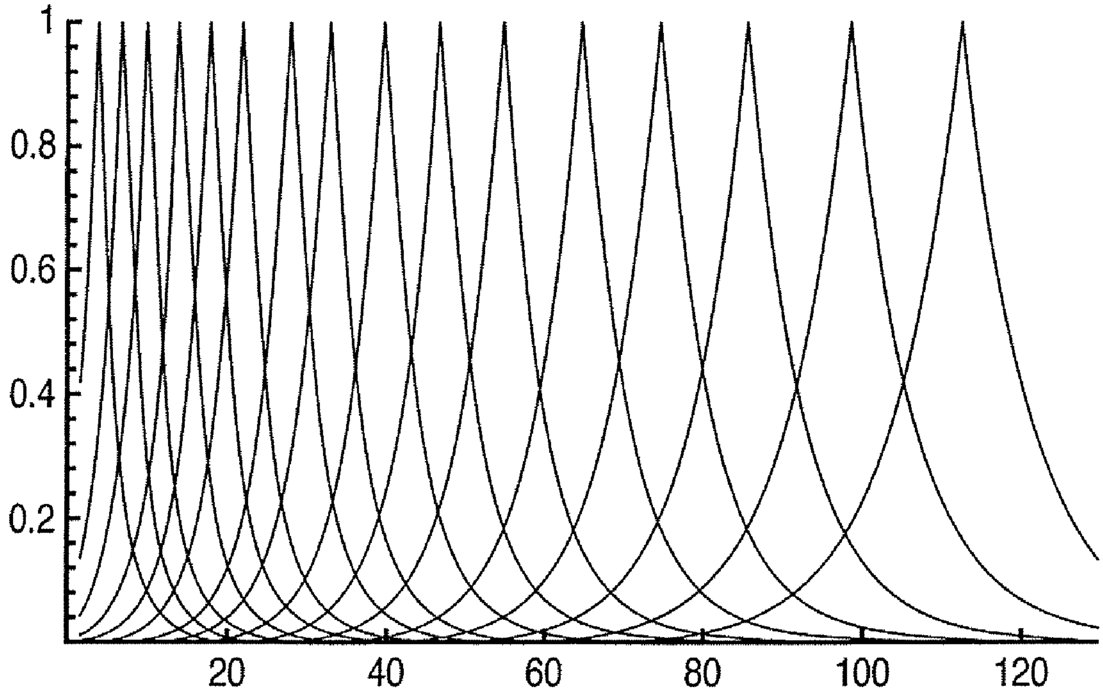
FIG. 2 shows the Kalman smoother weights for the spectrum at mel sampling points (the weights are un-normalized to emphasize the relationship with mel bins)
Figure 3:
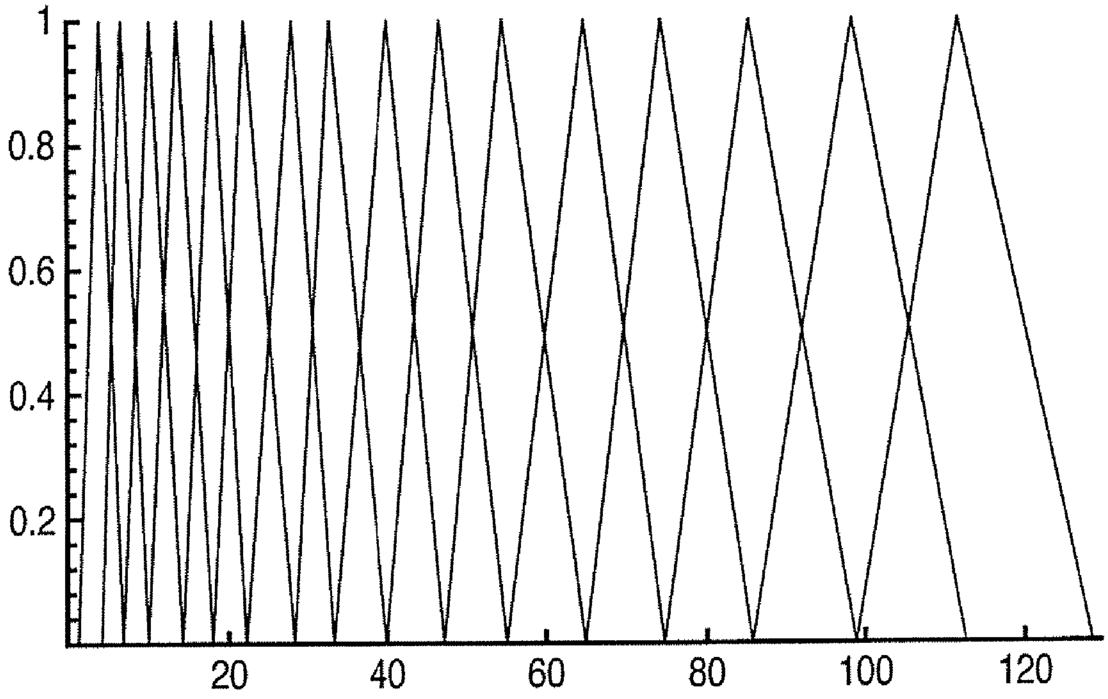
FIG. 3 shows traditional mel bins.

The filter coefficients are chosen such that, in the case of ASR, the subsequent mel filtering is unnecessary. The reduced size mel PSD can be constructed trivially by sampling the full PSD. This is illustrated in FIG. 2, which shows un-normalized impulse responses of the Kalman smoother for 16 impulses centered on the response peaks. FIG. 3 shows traditional mel bins centered at the same points.

In the case of enhancement, the full PSD is used to construct, for example, a Wiener filter.

[Feature Extracting Process]

Next, a feature extracting process will be described in detail. The same or similar method could be modified by a person skilled in the art to perform speech enhancement as described above.

Figure 4:
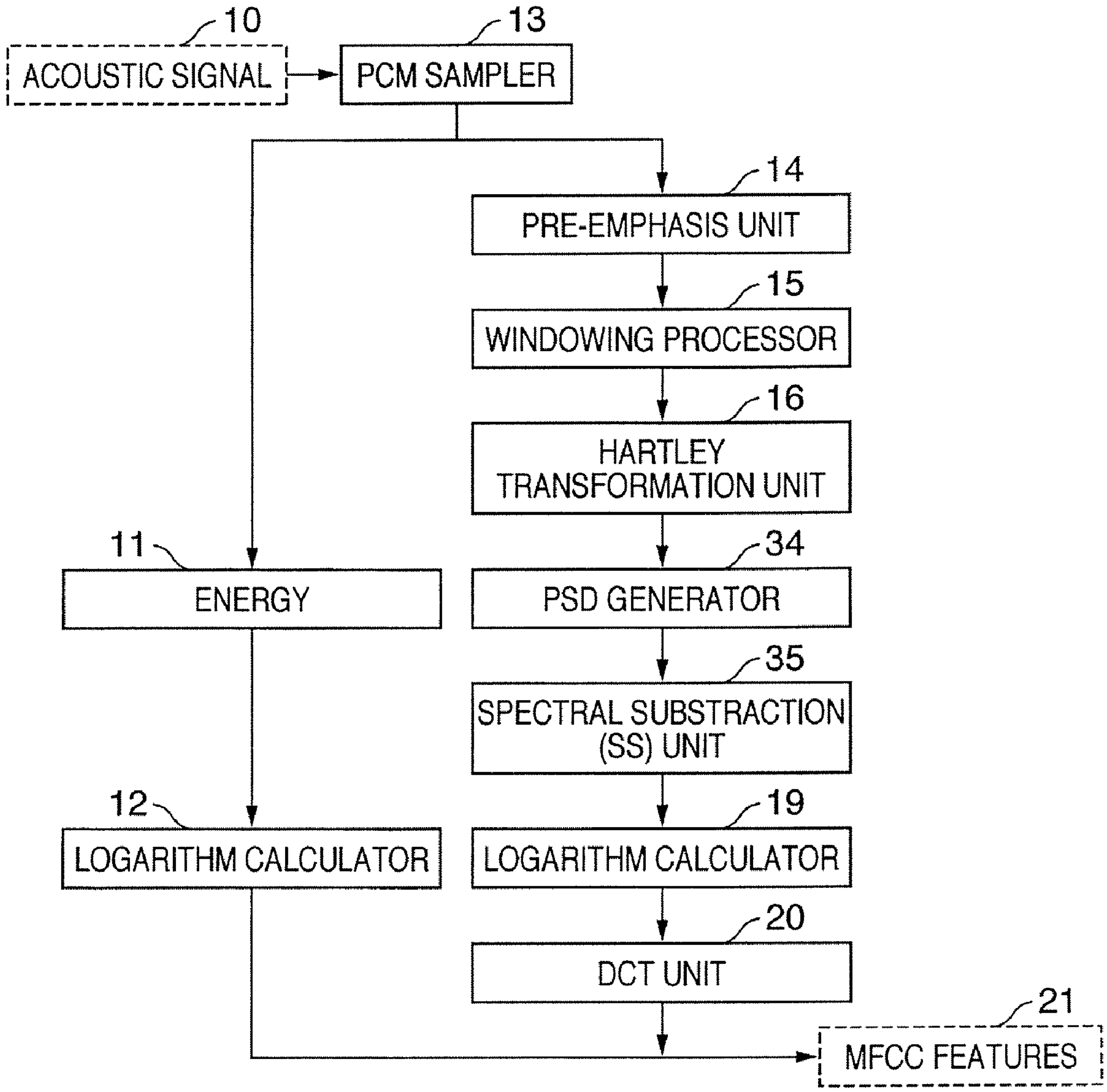
FIG. 4 shows data flow though an ASR front-end.

FIG. 4 shows data flow though an ASR front-end.

Initially, the procedure is the same as in a usual ASR front-end. The acoustic signal 10 from a microphone is sampled by a PCM sampler 13 at, for example, 11.025 kHz, and is filtered by a pre-emphasis unit 14 to remove DC and emphasize high frequencies (or de-emphasize low-frequencies). The embodiment uses the following equation.

$$x_t' = x_t - x_{t-1} \tag{1}$$

where $x_t$ is the sample at time t.

The filtered signal is then divided into frames of 256 samples each by a windowing processor 15 with a Hamming window. A new frame is begun every 110 samples, meaning that the frames overlap with each other and 100 frames are begun every second.

After that, each frame is transformed by a Hartley transformation unit 16. Each of the two outputs of the Hartley transformation unit 16 corresponding to the same frequency are squared and added to form the raw PSD by a PSD generator 34. It is well known in the art that a Hartley transform used in this way gives the same result as using an FFT or DFT (Discrete Fourier transform). The raw PSD vector is represented as p, and the $k^{th}$ value of p is represented as $p_k$. The PSD vector has K values, and in the embodiment, K=129.

Figure 5:
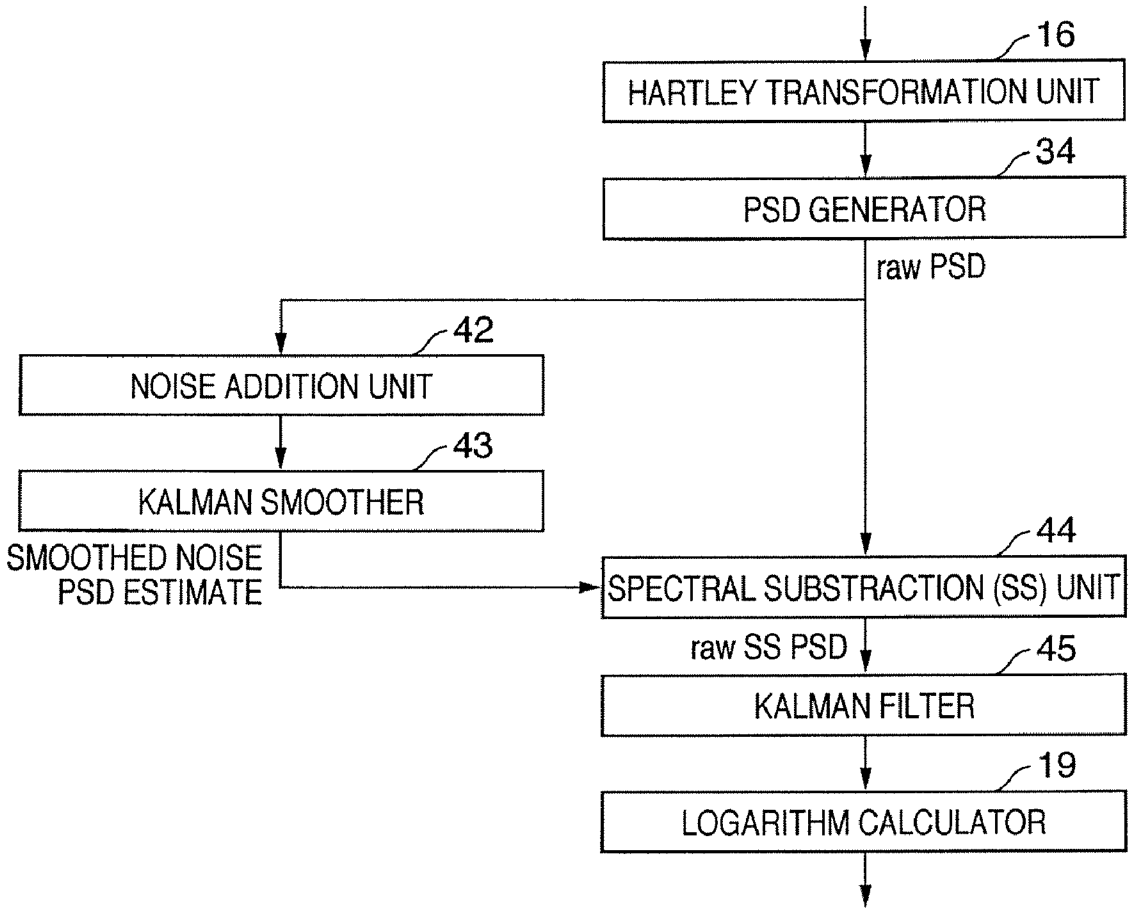
FIG. 5 shows a portion of an ASR front-end modified to perform Kalman smoothed spectral subtraction.

At this point, the processing differs from the usual ASR front-end. FIG. 5 shows a block diagram of an SS unit 35. In other words, FIG. 5 shows construction different from the usual ASR front-end.

In FIG. 5, a noise addition unit 42 sums the first N frames to form a noise PSD estimate. In this embodiment, N=9. A Kalman smoother 43 filters the summed vector by using a first recursive filter. The first recursive filter is defined as follows:

$$d_k = \frac{a_k}{a_k + N} d_{k-1} + \frac{1}{a_k + N} \sum_{f=1}^{N} p_{f,k} \tag{2}$$

where the term in the summation is the $k^{th}$ element of the $f^{th}$ PSD frame, and $a_k$ is defined later.

The first recursive filter begins at the lowest frequency value of the PSD and proceeds towards the highest frequency value. The lowest frequency filter value is initialized as follows:

$$d_1 = \frac{1}{N} \sum_{f=1}^{N} p_{f,1} \tag{3}$$

The Kalman smoother 43 filters the summed vector by using a second recursive filter. The second recursive filter is defined as follows:

$$e_k = \frac{a_k}{a_k + N} e_{k+1} + \frac{1}{a_k + N} \sum_{f=1}^{N} p_{f,k} \tag{4}$$

The second recursive filter begins at the highest frequency value of the PSD and proceeds towards the lowest frequency value. The highest frequency filter value is initialized as follows:

$$e_K = \frac{1}{N} \sum_{f=1}^{N} p_{f,k} \tag{5}$$

The Kalman smoother 43 linearly combines the results of the first and second recursive filters to obtain a smoothed noise PSD estimate by equation (6) except for the lowest and highest frequency values.

$$n_k = \frac{1}{2a_k + N}(d_{k-1} + e_{k+1}) + \frac{a_k}{2a_k + N} \sum_{f=1}^{N} p_{f,k} \tag{6}$$

The lowest frequency value is calculated as follows:

$$n_1 = \frac{1}{a_1 + N} e_2 + \frac{a_1}{a_1 + N} \sum_{f=1}^{N} p_{f,1} \tag{7}$$

The highest frequency value is calculated as follows:

$$n_K = \frac{1}{a_K + N} d_{K-1} + \frac{a_K}{a_K + N} \sum_{f=1}^{N} p_{f,K} \tag{8}$$

After the noise PSD estimate has been calculated, it is used to calculate a smoothed SS PSD estimate for each frame. First, an SS unit 44 calculates a raw SS PSD by subtracting the noise PSD estimate from the PSD frame by equation (9).

$$s_k = p_k - n_k \tag{9}$$

The SS unit 44 replaces any negative SS PSD values with zero, and calculates a flooring value for the smoothed PSD by equation (10).

$$c_k = \frac{p_k}{16} \tag{10}$$

where the value 16 is an empirically determined constant.

A Kalman filter 45 filters the SS PSD vector by using a first recursive filter defined by equation (11) in a way similar to the noise estimate above.

$$g_k = \frac{a_k}{a_k + b + 1} g_{k-1} + \frac{1}{a_k + b + 1} s_k + \frac{b}{a_k + b + 1} c_k \tag{11}$$

In the embodiment, b=2. The first recursive filter begins at the lowest frequency value of the PSD and proceeds towards the highest frequency value. The lowest frequency filter value is initialized as follows:

$$g_1 = \frac{1}{b+1} s_1 + \frac{b}{b+1} c_1 \tag{12}$$

The Kalman filter 45 filters the SS PSD vector by using a second recursive filter defined as follows:

$$h_k = \frac{a_k}{a_k + b + 1} h_{k+1} + \frac{1}{a_k + b + 1} s_k + \frac{b}{a_k + b + 1} c_k \tag{13}$$

The second recursive filter begins at the highest frequency value of the PSD and proceeds towards the lowest frequency value. The highest frequency filter value is initialized as follows:

$$h_K = \frac{1}{b+1} s_K + \frac{b}{b+1} c_K \tag{14}$$

The Kalman filter 45 linearly combines the results of the first and second recursive filters to obtain a smoothed SS PSD estimate by equation (15) expect for the lowest and highest frequency values.

$$q_k = \frac{1}{2a_k + b + 1}(g_{k-1} + h_{k+1}) + \frac{a_k}{2a_k + b + 1}s_k + \frac{b}{2a_k + b + 1}c_k \quad (15)$$

The lowest frequency value is calculated as follows:

$$q_1 = \frac{1}{a_1 + b + 1}h_2 + \frac{a_1}{a_1 + b + 1}s_1 + \frac{b}{a_1 + b + 1}c_1 \quad (16)$$

The highest frequency value is calculated as follows:

$$q_K = \frac{1}{a_K + b + 1}g_{K-1} + \frac{a_K}{a_K + b + 1}s_K + \frac{b}{a_K + b + 1}c_K \quad (17)$$

In order to calculate the values $a_k$ used in the calculations above, $a_k$ is defined to be half the width of the mel triangle that would be at position k in the PSD if a mel filter were being used. This can be calculated as follows:

$$a_k = \frac{\left(700 + \frac{k-1}{2K}r\right)K}{1127Wr} \quad (18)$$

where r is the sampling rate (11025 in the embodiment), and W is the width of a mel triangle measured in mels.

In the embodiment, the equivalent of 32 mel triangles spaced equally between 300 Hz (401.97 mels) and 5000 Hz (2363.5 mels) is simulated, so W is defined by follows:

$$W = \frac{2363.5 - 401.97}{33} \quad (19)$$

As the mel filtering is incorporated into the Kalman filter 45 via the coefficients $\alpha_k$, there is no need to do mel filtering after the smoothed SS PSD estimate has been calculated.

In the embodiment, 32 values are sampled from the smoothed SS PSD vector such that the 32 values are equally spaced on a mel scale. The sampling points correspond to the peaks shown in FIG. 3. Note that FIG. 3 differs from the embodiment in that the abscissa is the PSD index and there are only 16 triangles equally spaced along the whole range.

At this point, the processing reverts to the usual processing for an ASR front-end. The 32 mel values are passed though the logarithm calculator 19 and a DCT (Discrete Cosine Transform) unit 20 to form MFCC (Mel Frequency Cepstrum Coefficient) features 21. The MFCC features are preferably normalized by CMS (Cepstrum Mean Subtraction). CMS is well known in the art and is therefore not described here.

According to the above embodiment, noise is estimated from a sampled signal, and the noise in the sampled signal is reduced based on the estimation result, by the improved and computationally efficient signal processing.

Modification of Embodiment

Although the above embodiment describes an audio signal, the signal could be any form of sampled signal such as sonar or radar.

The pre-emphasis unit 14 and windowing processor 15 are typically used in ASR, but are not necessary, and could be omitted or replaced with another pre-processor without detracting from the spirit of this invention. Similarly, the logarithm calculator 19 and DCT unit 20 are typically used in ASR but are not necessary. They could be replaced with another post-processor without detracting from the spirit of the invention.

The mel scale is typically used in ASR, but it could be replaced with any other linear or non-linear warping such as the Bark scale without detracting from the spirit of the invention.

The FFT, DFT and Hartley transforms are well known in the art to produce the same arithmetic result, differing only in computational complexity. Other techniques that produce spectral representations are also well known. Any of these techniques can be used without detracting from the spirit of the invention.

In the above embodiment, the PSD noise estimate is calculated once. However, the noise estimate could be updated either continuously or during pauses in the speech signal in order to track changes in the background noise.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides the case that above-described functions according to the above embodiments are be realized by executing the program code that is read by a computer, the present invention includes a case where an OS (operating system) or the like working on the computer performs part or all of the processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs part or all of the processes in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-121270, filed Apr. 25, 2006, which is hereby incorporated by reference herein in its entirety.

What is claimed is:

1. A signal processing apparatus for smoothing power spectral density of a speech signal, comprising:

an acquisition section configured to acquire the power spectral density of a plurality of frames of the speech signal;

an estimator configured to estimate an estimated value of power spectral density of noise based on the power spectral density of the plurality of frames of the speech signal;

a subtraction section configured to subtract the estimated value from the power spectral density of each frame of the speech signal so as to determine a spectral subtraction of the power spectral density of each frame of the speech signal; and a determiner configured to perform a first filtering process and a second filtering process on the spectral subtraction of the power spectral density of each frame of the speech signal, and to linearly combine results of the first and second filtering processes so as to determine a smooth spectral subtraction of the power spectral density of each frame of the speech signal, wherein the first filtering process begins at the lowest frequency of the power spectral density and proceeds towards the highest frequency of the power spectral density, and the second filtering process begins at the highest frequency of the power spectral density and proceeds towards the lowest frequency of the power spectral density, and wherein the first and second filtering processes use a plurality of filtering coefficients, where each of the filtering coefficients respectively depends on the frequency of each frame contained between the lowest frequency and the highest frequency of the power spectral density of the speech signal.

2. A method of smoothing power spectral density of a speech signal, comprising:

using a processor to perform the steps of:

acquiring the power spectral density of a plurality of frames of the speech signal;

estimating an estimated value of power spectral density of noise based on the power spectral density of the plurality of frames of the speech signal;

subtracting the estimated value from the power spectral density of each frame of the speech signal so as to determine a spectral subtraction of the power spectral density of each frame of the speech signal; and performing a first filtering process and a second filtering process on the spectral subtraction of the power spectral density of each frame of the speech signal, and to linearly combine results of the first and second filtering processes so as to determine a smooth spectral subtraction of the power spectral density of each frame of the speech signal, wherein the first filtering process begins at the lowest frequency of the power spectral density and proceeds towards the highest frequency of the power spectral density, and the second filtering process begins at the highest frequency of the power spectral density and proceeds towards the lowest frequency of the power spectral density, and wherein the first and second filtering processes use a plurality of filtering coefficients, where each of the filtering coefficients respectively depends on the frequency of each frame contained between the lowest frequency and the highest frequency of the power spectral density of the speech signal.

3. A non-transitory computer-readable medium storing a computer-executable program for causing a computer to perform a method of smoothing power spectral density of a speech signal, the method comprising the steps of:

acquiring the power spectral density of a plurality of frames of the speech signal;

estimating an estimated value of power spectral density of noise based on the power spectral density of the plurality of frames of the speech signal;

subtracting the estimated value from the power spectral density of each frame of the speech signal so as to determine a spectral subtraction of the power spectral density of each frame of the speech signal; and performing a first filtering process and a second filtering process on the spectral subtraction of the power spectral density of each frame of the speech signal, and to linearly combine results of the first and second filtering processes so as to determine a smooth spectral subtraction of the power spectral density of each frame of the speech signal, wherein the first filtering process begins at lowest frequency of the power spectral density and proceeds towards highest frequency of the power spectral density, and the second filtering process begins at the highest frequency of the power spectral density and proceeds towards the lowest frequency of the power spectral density, and wherein the first and second filtering processes use a plurality of filtering coefficients, where each of the filtering coefficients respectively depends on the frequency of each frame contained between the lowest frequency and the highest frequency of the power spectral density of the speech signal.

* * * * *